(12) United States Patent
Lee et al.

(10) Patent No.: US 8,594,860 B2
(45) Date of Patent: Nov. 26, 2013

(54) APPARATUS AND METHOD WITH MOBILE RELOCATION

(75) Inventors: Hyoung-Ki Lee, Seongnam-si (KR); Jong-Dae Jung, Seoul (JP)

(73) Assignee: Samsung Electronics Co., Ltd., Suwon-Si (KR)

( * ) Notice: Subject to any disclaimer, the term of this patent is extended or adjusted under 35 U.S.C. 154(b) by 93 days.

(21) Appl. No.: 13/285,395

(22) Filed: Oct. 31, 2011

(65) Prior Publication Data

US 2012/0109420 A1     May 3, 2012

(30) Foreign Application Priority Data

Nov. 1, 2010   (KR) .................. 10-2010-0107819

(51) Int. Cl.
*G05D 1/00*     (2006.01)
*G05D 3/00*     (2006.01)
*G06F 7/00*     (2006.01)
*G06F 17/00*    (2006.01)

(52) U.S. Cl.
USPC ............................................................. 701/2

(58) Field of Classification Search
USPC ............................................................. 701/2
See application file for complete search history.

(56) References Cited

U.S. PATENT DOCUMENTS

| | | | |
|---|---|---|---|
| 6,098,107 A * | 8/2000 | Narvaez-Guarnieri et al. | 709/239 |
| 6,529,642 B1 * | 3/2003 | Lai et al. | 382/298 |
| 6,666,823 B2 * | 12/2003 | Yao | 600/443 |
| 7,496,444 B1 * | 2/2009 | Fried | 701/426 |
| 7,555,705 B2 * | 6/2009 | Chen et al. | 715/230 |
| 7,859,546 B2 * | 12/2010 | Gornowicz et al. | 345/581 |
| 8,004,519 B2 * | 8/2011 | Gornowicz et al. | 345/420 |
| 8,060,389 B2 * | 11/2011 | Johnson | 705/6 |
| 8,280,574 B2 * | 10/2012 | Yabushita et al. | 701/25 |
| 8,289,159 B2 * | 10/2012 | Julian et al. | 340/539.32 |
| 8,296,112 B2 * | 10/2012 | Tanaka | 703/9 |
| 2004/0193365 A1 * | 9/2004 | Kokojima et al. | 701/201 |

(Continued)

FOREIGN PATENT DOCUMENTS

| | | |
|---|---|---|
| JP | 2008-234350 | 10/2008 |
| JP | 2008-250906 | 10/2008 |

(Continued)

OTHER PUBLICATIONS

PCT/JP2008/062543, Mar. 2009, Machine Translation.*

(Continued)

*Primary Examiner* — Mary Cheung
*Assistant Examiner* — Frederick Brushaber
(74) *Attorney, Agent, or Firm* — Staas & Halsey LLP (57) ABSTRACT

An apparatus and method relocating a robot. The apparatus may include a particle generating unit, a first distance obtaining unit, a second distance obtaining unit, and a position estimating unit. A plurality of particles may be generated on a map, a first distance may be obtained according to respective distances between each particle of the plurality of particles and a wireless communication apparatus, based on a position of the wireless communication apparatus and respective positions of each particle on the map, a second distance may be obtained according to respective determined distances between the wireless communication apparatus and the robot, based on a strength measure of the electromagnetic signal received by the robot from the wireless communication apparatus or based on an arrival time or time of flight of the electromagnetic signal, and a position of the robot may be estimated by comparing the first distance and the second distance.

21 Claims, 12 Drawing Sheets

(56) References Cited

U.S. PATENT DOCUMENTS

| | | | |
|---|---|---|---|
| 2006/0149465 A1* | 7/2006 | Park et al. | 701/209 |
| 2006/0167601 A1* | 7/2006 | Henning et al. | 701/30 |
| 2007/0276541 A1* | 11/2007 | Sawasaki | 700/253 |
| 2009/0043489 A1* | 2/2009 | Weidner | 701/201 |
| 2010/0082194 A1* | 4/2010 | Yabushita et al. | 701/25 |

FOREIGN PATENT DOCUMENTS

| | | | |
|---|---|---|---|
| KR | 10-2006-0043147 | | 5/2006 |
| KR | 10-2007-0026912 | | 3/2007 |
| KR | 10-2007-0072305 | | 7/2007 |
| WO | PCT/JP2008/062543 | * | 3/2009 |

OTHER PUBLICATIONS

Product sheet for NorthStar Low Cost, Indoor Localization; http://www.evolution.com/products/northstar.pdf; Evolution Robotics "Making Everyday Products Smarter."

Hagisonic "Starbazer" product listing; http://wvvw.hagisonic.com/cnt/prod/prod010101.html?cateID=2.

Teemu Roos et al., "A Probabilistic Approach to WLAN User Location Estimation," International Journal of Wireless Information Networks, vol. 9, No. 3, Jul. 2002, pp. 122-164.

* cited by examiner

APPARATUS AND METHOD WITH MOBILE RELOCATION

CROSS-REFERENCE TO RELATED APPLICATIONS

This application claims the benefit under 35 U.S.C. §119(a) of Korean Patent Application No. 10-2010-0107819, filed on Nov. 1, 2010, the disclosure of which is incorporated by reference in its entirety for all purposes.

BACKGROUND

1. Field

One or more embodiments relate to a mobile device with a relocation technique capability, and method for the same, for estimating a position of the mobile device.

2. Description of the Related Art

The term "robot" has been generally applied to an autonomous figure having a human form which is equipped with a machine to operate body parts including mechanical limbs to perform functions in a humanlike manner. However, nowadays, even though the term of 'robot' can refer to a machine that may not resemble human beings in appearance, some robots may still be able to autonomously perform tasks.

For example, a mobile robot may be desirable for performing tasks in harsh environments or dangerous areas, replacing humans. In addition, a domestic mobile robot, such as a cleaning robot, which autonomously moves within a home is becoming increasingly common for helping housework.

In order for a mobile robot to autonomously perform a task while moving, it is desirable for the mobile robot to determine the location of the mobile robot. In a complex indoor environment, the mobile robot may build a map of a surrounding environment while estimating its position by use of various types of sensors. However, even when a map is available, there may be the occasion where the mobile robot slips, is moved to an unknown location, or the mobile robot is moved to a predetermined position where the robot loses information about its original position. Accordingly, there is a need for a relocation capability for mobile robots to reacquire or relocate their current positions.

SUMMARY

According to one or more embodiments, there is provided an apparatus for relocating a robot, the apparatus including a particle generating unit configured to generate a plurality of particles and arrange the plurality of particles on a map, a first distance obtaining unit configured to obtain a first distance according to respective distances between each particle of the plurality of particles and a wireless communication apparatus performing wireless communication with the robot, the respective distances being based on a position of the wireless communication apparatus and respective positions of each particle on the map, a second distance obtaining unit configured to obtain a second distance according to a determined distance between the wireless communication apparatus and the robot, the determined distance being based on a strength measure of an electromagnetic signal received by the robot from the wireless communication apparatus or based on an arrival time or time of flight of the electromagnetic signal, and a position estimating unit configured to estimate a position of the robot by use of the first distance and the second distance.

According to one or more embodiments, there is provided a method of relocating a robot, the method including generating a plurality of particles and arranging the plurality of particles on a map, obtaining a first distance according to respective distances between each particle of the plurality of particles and a wireless communication apparatus performing wireless communication with the robot, the respective distances being based on a position of the wireless communication apparatus and respective positions of each particle on the map, obtaining a second distance according to a determined distance between the wireless communication apparatus and the robot, the determined distance being based on a strength measure of an electromagnetic signal received from the wireless communication apparatus or based on an arrival time or time of flight of the electromagnetic signal, and estimating a position of the robot by use of the first distance and the second distance.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 1:
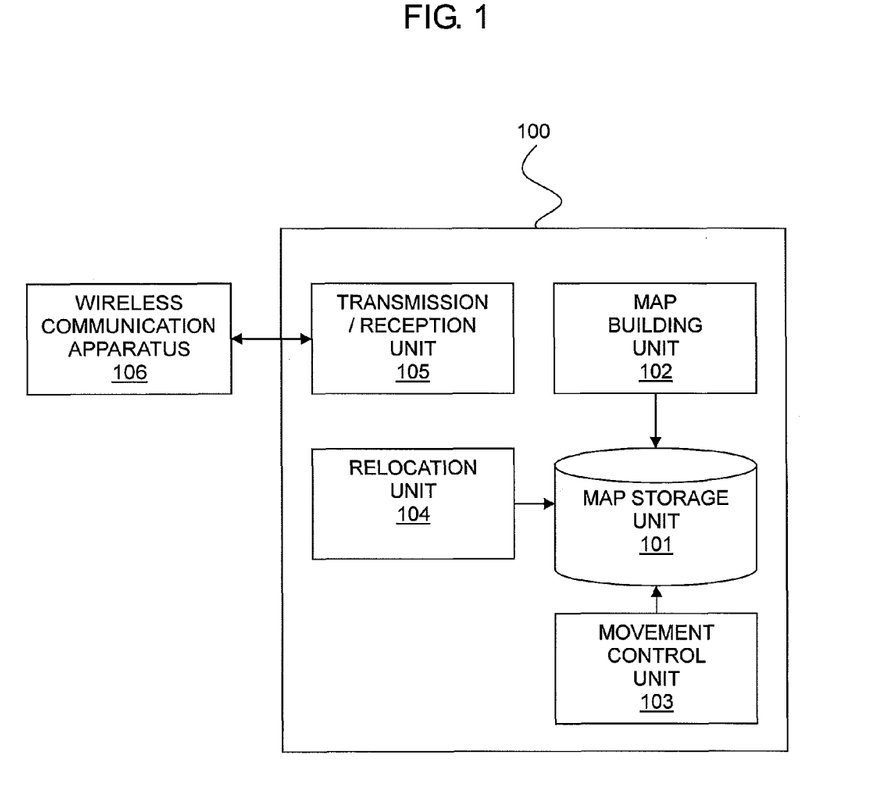
FIG. 1 illustrates a robot, according to one or more embodiments.

FIG. 1 illustrates a robot, according to one or more embodiments.

As shown in FIG. 1, in one or more embodiments, a robot 100 may be implemented as a mobile robot, for example, a cleaning robot, which builds a map about a surrounding environment and performs a predetermined task based on the built map, or alternative device or mobile device embodiments for which the reliance on built maps are desired. In one or more embodiments, such maps may be built while the robot 100 is moving, e.g., a current map can be augmented, added to, or deleted from, in a real-time manner. The robot 100 may include a map storage unit 101, a map building unit 102, a movement control unit 103, a relocation unit 104, and a transmission/reception unit 105, for example. In one or more embodiments, the robot 100 includes a driving unit and a moving unit, with the driving unit driving the moving unit to move the robot 100. For example, in an embodiment, the moving unit includes a plurality of wheels, and the driving unit includes a driving force to cause the plurality of wheels to rotate, as only an example. A slipping may occur when an expected movement of the robot 100 by the moving unit actually moves the robot 100 differently than expected, e.g., with one or more wheels slipping. In one or more embodiments, the robot includes one or more electromagnetic sensors for observing and obtaining information from the surrounding environment of the robot, such as optical sensors that may capture image data, radio frequency (RF) sensors, infrared (IR) sensors, and ultrasonic sensors, as only examples.

The map storage unit 101 may store map information about a work space, e.g., about the space surrounding the robot or in surroundings where the robot is expected to be present and perform tasks. The map information stored in the map storage unit 101 may be a grid map, for example, and may be obtained or generated by dividing a work space of the robot into a plurality of same sized lattices or cells, as only examples, and representing the presence of an object in each lattice or cell in the grid map.

The map building unit 102 may build map information, which may be stored in the map storage unit 101. In addition, the map building unit 102 may update the map information stored in the map storage unit 101. For example, the map building unit 102 may build a map through a Simultaneous Localization And Mapping (SLAM) technique while calculating the current position of a robot based on the built map.

The movement control unit 103 may control the movement or operation of the robot 100 such that the robot 100 performs a predetermined task in the work space, for example, or control the movement of the robot 100 to move the robot to a predetermined position on a map stored in the map storage unit 101, as only examples. In an embodiment, the movement control unit 103 may control the driving unit to drive the moving unit, for moving the robot to the predetermined position.

The relocation unit 104 may estimate the position of the robot 100 when the robot 100 has been moved to the predetermined position where current location information is lost, slips, or is moved to an unknown location, as only examples. For example, the map building unit 102 of the robot 100 estimates the position of the robot 100, while building a map, when the map building unit 102 loses map information which has been obtained up to a present time. Accordingly, the position of the robot 100 needs to be newly estimated. As described above, when the robot 100 loses the current location information, the relocation unit 104 may rapidly estimate the position of the robot 100.

The transmission/reception unit 105 performs wireless communication with a wireless communication apparatus 106 installed within the work space, separate from the robot 100. As only an example, the transmission/reception unit 105 may perform wireless communication with the wireless communication apparatus 106 using one or more electromagnetic signals, such as optical signals, radio frequency (RF) signals, infrared ray (IR) signals, ultrasonic signals, etc. For example, the wireless communication apparatus 106 may be implemented using an access point (AP) or a bluetooth module that performs wireless communication through optical signals, radio frequency signals, infrared ray signals, or ultrasonic signals, noting that alternative electromagnetic signals are available. One or more of the wireless communication apparatuses 106 may have a fixed location, or a dynamic location.

Figure 2:
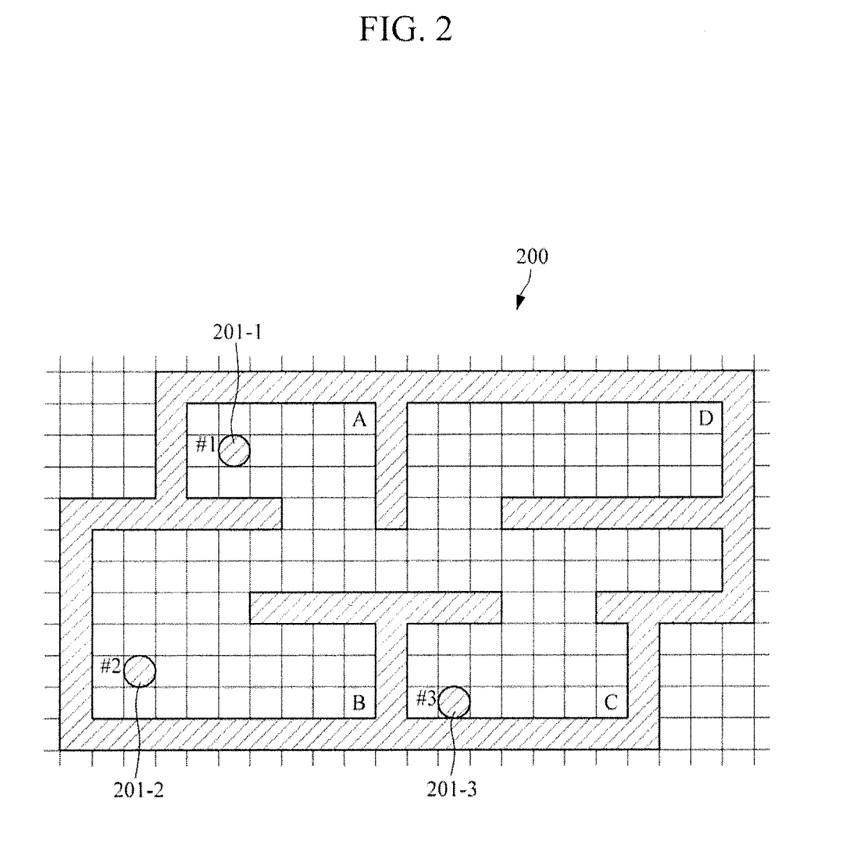
FIG. 2 illustrates map information, according to one or more embodiments.

FIG. 2 illustrates map information, according to one or more embodiments.

As shown in FIGS. 1 and 2, map information may be represented as a grid map 200. The grid map 200 may be stored in the map storage unit 101. The grid map 200 may be built or updated by the map building unit 102, for example. In one or more embodiments, the grid map may include all or some same sized polygonal cells, though embodiments also include one or more irregular sized cells and/or non-polygonal cells. Each cell may represent a particular sub-area of a physical area, i.e., work space for mapping by the robot.

The hatched portions of the grid map 200 represent wall surfaces, e.g., of the work space, or object(s) within the work space, and the inner non-hatched portions of the grid map 200 represent open spaces, e.g., which potentially may be indicative of being traversable by the robot. As illustrated in FIG. 2, the work space may include a first room A, a second room B, a third room C, a fourth room D, and an open area provided at the center of the work space.

The grid map 200 of FIG. 2 includes position information of one or more wireless communication apparatuses 106, such as wireless device #1 (201-1), wireless device #2 (201-2), and wireless device #3 (201-3). For example, wireless device #1 may be located in the first room A, wireless device #2 may be located in the second room B, and wireless device #3 may be located in the third room C. The respective positions of each of the wireless devices #1, #2, and #3 may be obtained at the same time as when the map building unit 102 is building the grid map 200, or they may be obtained at different times. In addition, one or more of the positions of the wireless devices #1, #2, and #3 may be subsequently directly input to a built map by a user, for example.

Figure 3:
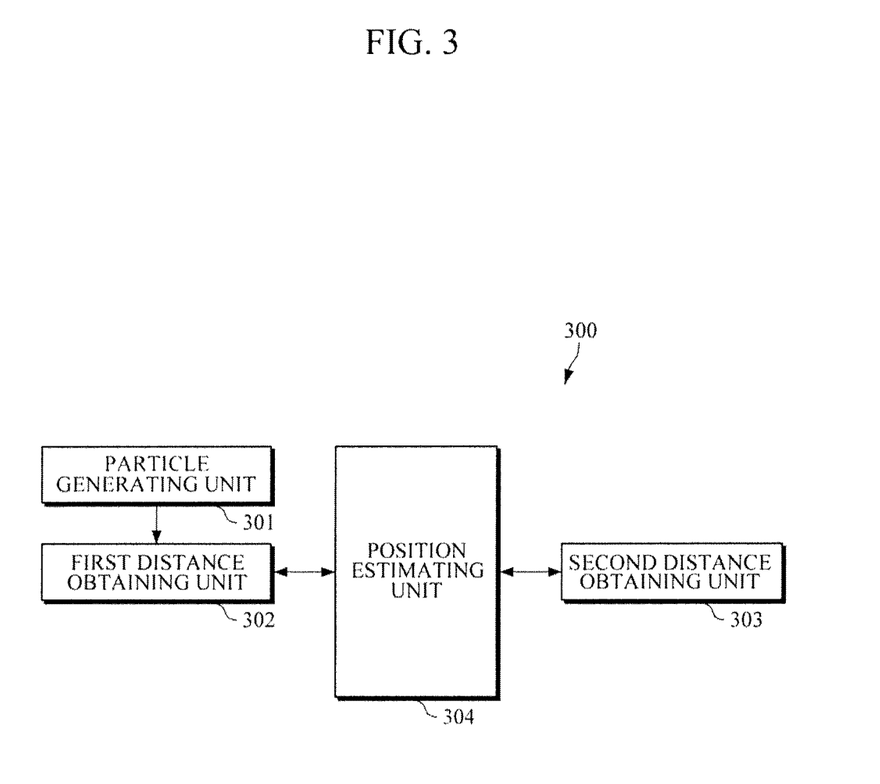
FIG. 3 illustrates a relocation apparatus, such as of the robot of FIG. 1, according to one or more embodiments.

FIG. 3 illustrates a relocation apparatus of a robot, such as the relocation unit 104 of FIG. 1, according to one or more embodiments.

As shown in FIG. 3, the relocation apparatus 300 may include a particle generating unit 301, a first distance obtaining unit 302, a second distance obtaining unit 303, and a position estimating unit 304, for example.

Figure 4:
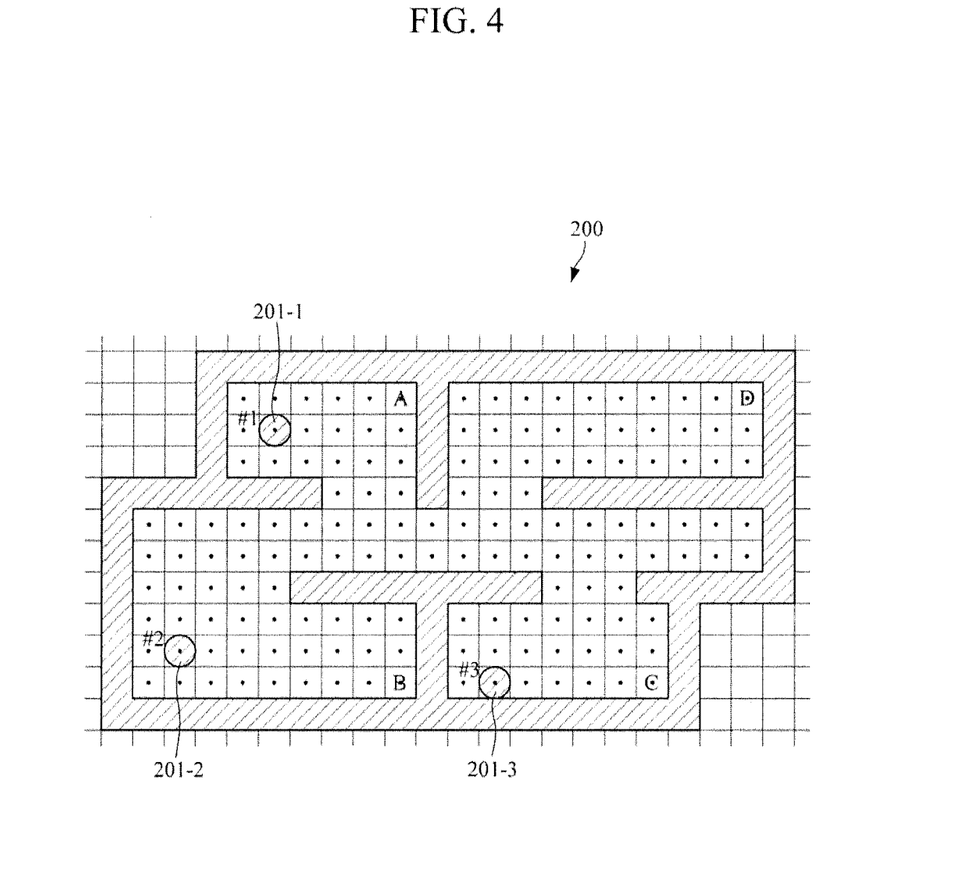
FIG. 4 illustrates a plurality of particles, according to one or more embodiments.

The particle generating unit 301 may generate a plurality of particles to respectively overlay, or to be respectively added to, differing positions on the map. As noted below, FIG. 4 illustrates respective coordinate points within each cell of the inner non-hatched portion of grid map 200, each coordinate point representing a particle, as only an example. For example, when a robot is moved to a predetermined position where current location information has been lost, the particle generating unit 301 may generate and overlay or store the plurality of particles. In one or more embodiments, each particle represents a potential position candidate of the robot.

Accordingly, FIG. 4 illustrates a plurality of generated particles, such as the particles generated by the particle generating unit 301 of FIG. 3, according to one or more embodiments.

In an embodiment, each particle may be a position candidate of the robot 100, generated on the grid map 200 using a coordinate system of the grid map 200, thereby having its own coordinates.

In an embodiment, the particle generating unit 301 generates particles such that the particles are uniformly distributed over the entire area of the map 200, noting that alternatives are available. For example, the particle generating unit 301 may generate particles such that the particles are concentrated on a select region(s) of the map that is expected to represent a location of the robot 100. Further, the particle generating unit 301 may generate particles such that the particles are distributed in only one or more predetermined regions of the map, e.g., less than all inner non-hatched cells of grid map 200.

Referring again to FIGS. 1 and 3, in one or more embodiments, the first distance obtaining unit 302 obtains a first distance, according to a distance of each particle of the plurality of particles with respect to one or more wireless communication apparatuses 106 performing a wireless communication with the robot 100. For example, respective first distances may be based on the respective positions of the wireless communication apparatuses 106 and the position of each particle on the map.

As an example, the first distance obtaining unit 302 may obtain the first distance by calculating a length of a straight path between the wireless communication apparatus 106 and each particle. The straight path may be modified to include a detour around an obstacle between the wireless communication apparatus 106 and a corresponding particle, and may extend along open spaces between the wireless communication apparatus 106 and the corresponding particle.

As another example, the first distance obtaining unit 302 may obtain the first distance by calculating the length of a shortest signal transmission path of the corresponding electromagnetic signals from the wireless communication apparatus 106 to each particle.

Figure 5:
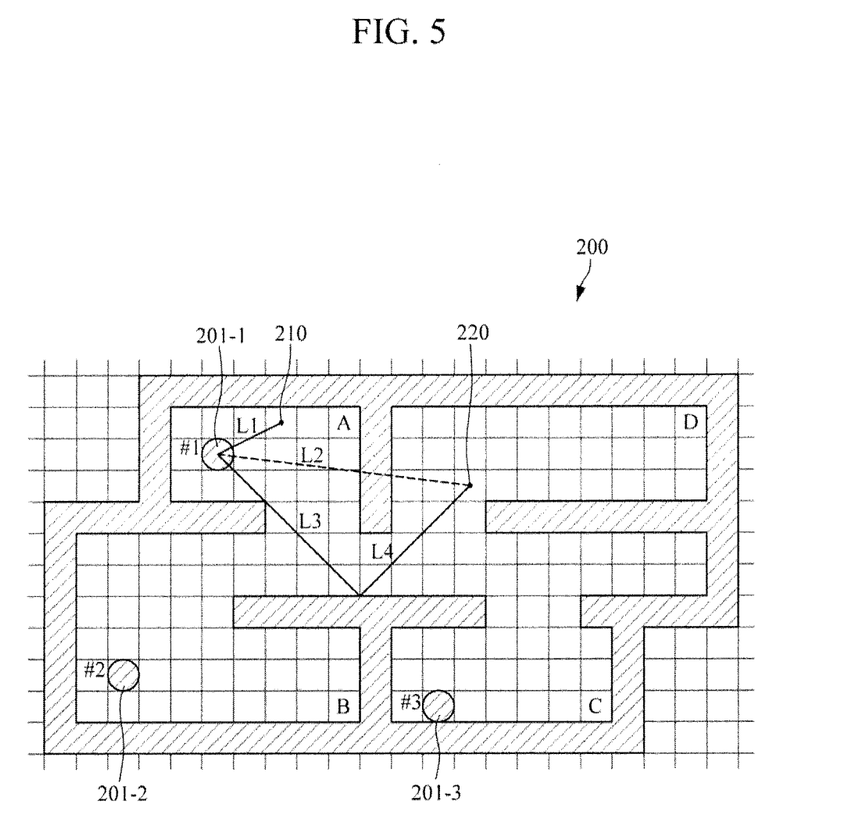
FIG. 5 illustrates a first distance, according to one or more embodiments.

FIG. 5 illustrates a first distance for estimating a position, according to one or more embodiments.

As shown in FIGS. 3 and 5, the first distance may be different for each particle and each wireless communication apparatus. As only a convenience, the below description will be made only in relation to the wireless device #1 (201-1), a particle 210, and a particle 220, as an example, noting that these details may be applied to the remaining wireless communication apparatuses and particles.

The first distance between the wireless device #1 (201-1) and the particle 210 corresponds to the length of a straight line connecting the wireless device #1 (201-1) to the particle 210 on the grid map 200. For example, the first distance between the wireless device #1 (201-1) and the particle 210 is shown as being the length of the straight line L1.

The first distance between the wireless device #1 (201-1) and the particle 220 corresponds to the length of a shortest signal transmission path of an electromagnetic signal when the electromagnetic signal is transmitted from the wireless device #1 (201-1) to the particle 220. For example, the first distance between the wireless device #1 (201-1) and the particle 220 is a summation of the length of the illustrated straight line L3 and the length of the illustrated straight line L4.

In this example, when a path including the straight line L3 and the straight line L4 is referred to as a detour path, the first distance obtaining unit 302 may identify the detour path as follows.

In an embodiment, the first distance obtaining unit 302 searches for a straight line L2 connecting the wireless device #1 (201-1) and the particle 220. The first distance obtaining unit 302 determines whether the straight line L2 passes through an obstacle. If an obstacle, such as a wall, exists along the straight line L2, the first distance obtaining unit 302 searches for open spaces around the obstacle and searches for at least one straight line, for example, the line L3 and the line L4 that connect the wireless device #1 (201-1) to the particle 220 through the open spaces.

FIGS. 6A to 6F illustrate a method of obtaining a first distance for estimating a position, according to one or more embodiments.

Figure 6A:
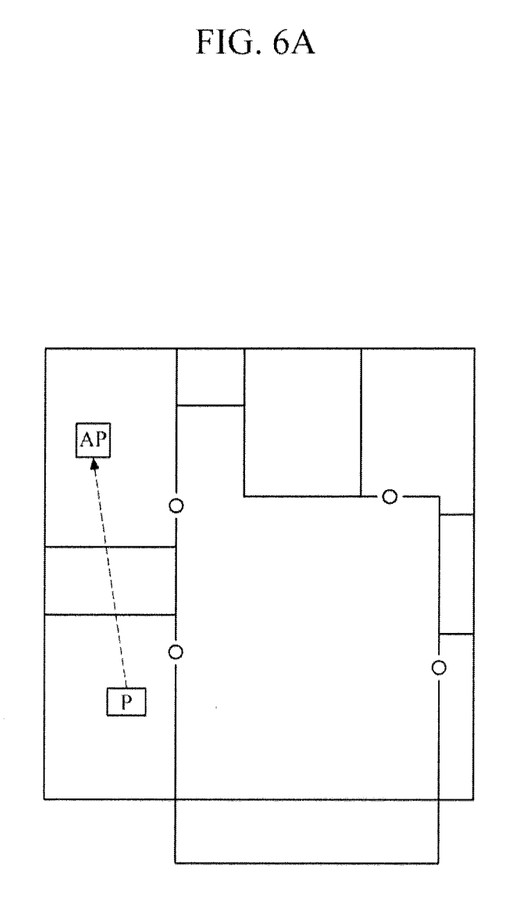
FIGS. 6A to 6F illustrate an obtaining of a first distance, according to one or more embodiments.

In FIG. 6A, the first distance may be represented as the length (L) of the shortest signal transmission path from a particle $P_i$ to a wireless communication apparatus $AP_j$. The length (L) is expressed as $L_0+L_1+\ldots+L_k$. Here, k is an index corresponding to the number of reflections when a signal is transmitted. For example, the length (L) of the shortest signal transmission path may include k+1 straight lines. Further, i and j are indexes used to identify each particle and each wireless communication apparatus. For example, the first distance may be obtained for each particle and each wireless communication apparatus.

When a line connects a particle P to a wireless communication apparatus AP, and if the line does not pass through an obstacle, the first distance corresponds to the length of the line. However, if the line connecting the particle P to the wireless communication apparatus AP passes through an obstacle, a detour path making a detour around the obstacle is searched for and the first distance is obtained by use of the length of the detour path.

In order to identify a detour path, a first distance obtaining unit, such as the first distance obtaining unit 302 in FIG. 3, searches for an open space with respect to one or more pixels corresponding to the obstacle. A process of identifying an open space will be described with reference to FIGS. 6B and 6C.

Figure 6B:
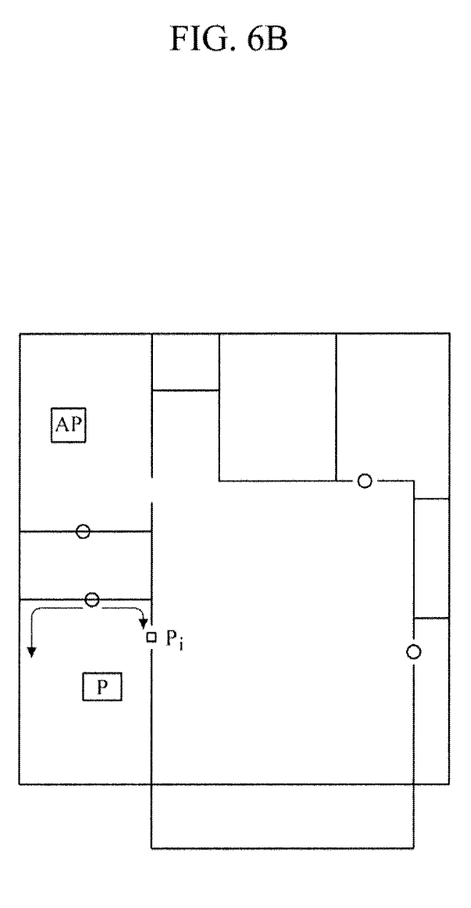

In FIG. 6B, the first distance obtaining unit may search for one or more pixels corresponding to an open space in a space having the particle P by examining pixels around the one or more pixels corresponding to the obstacle. For example, a pixel corresponding to an open space may be represented as $P_i$. The pixel $P_i$ may be a pixel corresponding to an entranceway of another room, area, or hallway, for example.

Figure 6C:
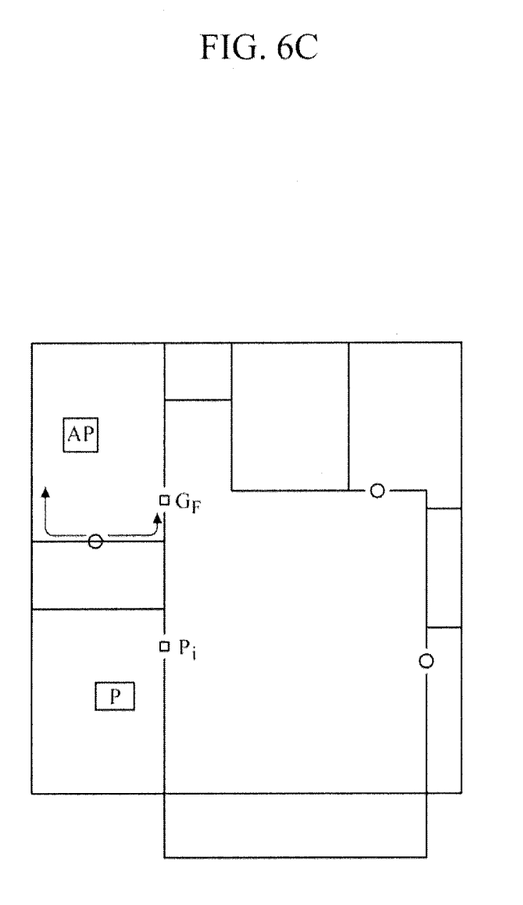

In addition, in FIG. 6C, the first distance obtaining unit may search for one or more pixels corresponding to an open space in a space, e.g., in a room of plural rooms of the work space, having the wireless communication apparatus AP by examining pixels around the one or more pixels corresponding to the obstacle. As a result, a pixel $G_F$ corresponding to the open space may be found. The pixel $G_F$ may be a pixel corresponding to another entranceway, for example.

If the pixel $P_i$ and the pixel $G_F$ are identified, a line $d_{iF}$ connecting the pixel $P_i$ to the pixel $G_F$ is generated. Unless the line $d_{iF}$ passes through an obstacle, the first distance may be obtained as the length of the detour path corresponding to the summation of a line P-$P_i$ between the particle P and the pixel $P_i$, the line $d_{iF}$, and a line AP-$G_F$ between the wireless communication apparatus AP and the pixel $G_F$.

Figure 6D:
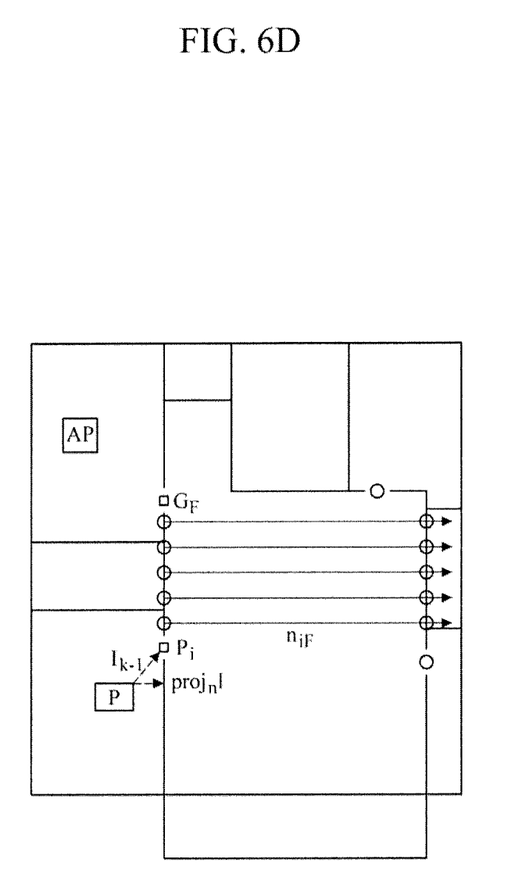
Figure 6E:
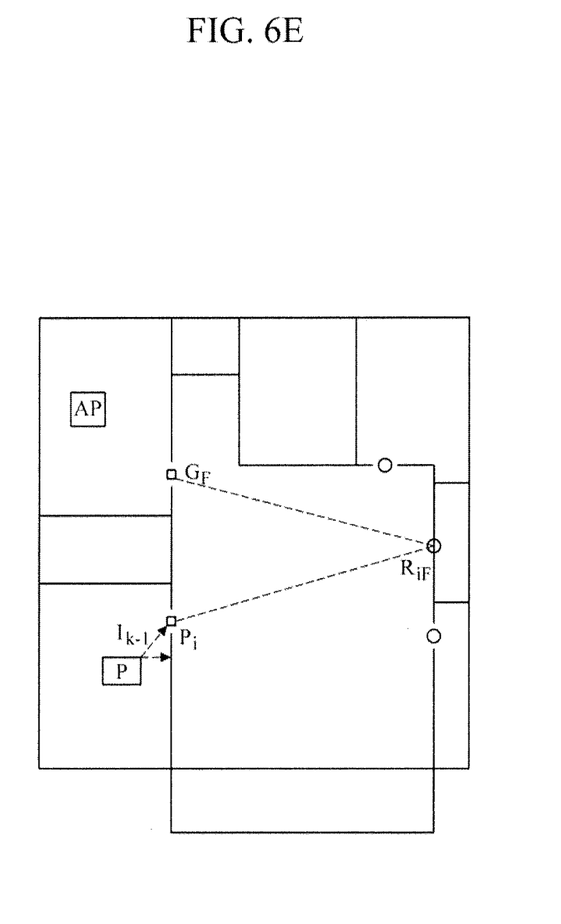
Figure 6F:
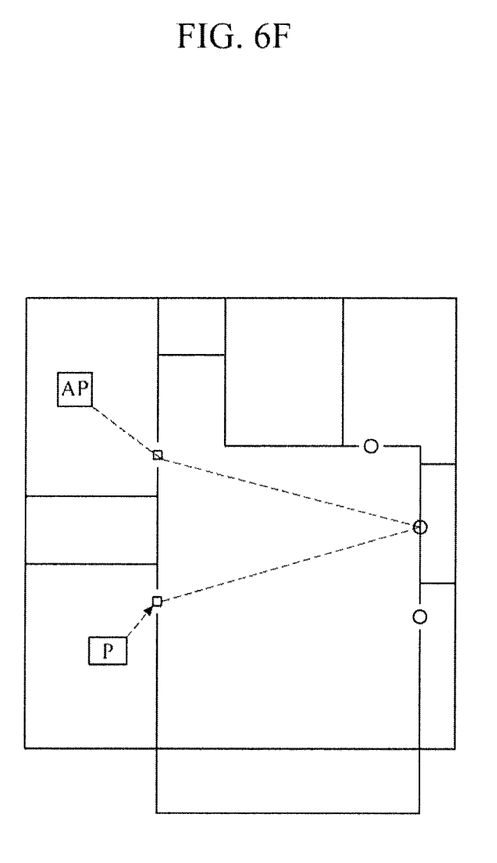

As shown in FIG. 6D, if the line $d_{iF}$ passes through an obstacle, e.g., the illustrated wall between the respective entranceways presented by pixels $P_i$ and $G_F$, a plurality of half-lines $n_{iF}$, which are spaced apart from each other at equal intervals between the pixel $P_i$ and the pixel $G_F$, are generated extending in a direction perpendicular relative to the line $d_{iF}$. Here, it is noted that alternative spacings of half-lines $n_{iF}$ and extension directions are also available, depending on embodiment. Further, such extension directions may include plural different extension directions. Thereafter, in FIG. 6E, select obstacle pixels $R_{iF}$ intersecting with the half-lines $n_{iF}$ are identified. The select obstacle pixel(s) may be identified as one or more of the obstacle pixels $R_{iF}$ producing the smallest summation of the distance from the pixel Pi to the pixel $R_{iF}$ and the distance from the pixel $R_{iF}$ to the pixel $G_F$ ($P_i \rightarrow R_{iF} \rightarrow G_F$). Finally, the first distance is calculated as the summation of detour paths shown in FIG. 6F. The resultant final path shown in FIG. 6F may be equal to the path of an electromagnetic signal, such as infrared ray signals, transmitted according to characteristics of the range of the electromagnetic signal.

Referring again to FIGS. 1 and 3, the second distance obtaining unit 303 of FIG. 3 may obtain a second distance, which indicates the distance between the wireless communication apparatus 106 and the robot 100, based on an identifiable strength measure of an electromagnetic signal received from the wireless communication apparatus 106 or based on a determined arrival time or time of flight (TOF) of the electromagnetic signal.

As an example, if the electromagnetic signal is implemented using radio frequency (RF) or infrared (IR) electromagnetic signals, the strength of the electromagnetic signal is in inverse proportion to the propagation distance of the electromagnetic signal. Accordingly, in an embodiment, the second distance obtaining unit 303 measures the strength of the electromagnetic signal received in the transmission/reception unit 105 of the robot 100, and thereby obtain the second distance between the wireless communication apparatus 106 and the robot 100.

As another example, the second distance may be obtained by multiplying a determined arrival time or time-of-flight (TOF), of the electromagnetic signal, e.g., detected by the robot 100 and/or the wireless communication apparatus 106, by the speed of light when an ultra-wide band (UWB) or Chirp Spread Spectrum (CSS) scheme is implemented, as only examples. Thus, in one or more embodiments, if the electromagnetic signal is implemented as ultrasonic signals, the second distance may be obtained by multiplying the arrival time or TOF time of an ultrasonic wave by the speed of ultrasonic wave.

The electromagnetic signal may reach the robot 100 through reflection and diffraction of the electromagnetic signal. Accordingly, the second distance may correspond to the length of the shortest signal transmission path of an electromagnetic signal when the electromagnetic signal transmits from the wireless communication apparatus 106 to the robot 100. For example, the second distance may not represent the physical distance between an object A and an object B, but rather may represent the length of the transmission path of an electromagnetic signal when the electromagnetic signal transmits from the object A to the object B.

In addition, in FIGS. 1 and 3, the position estimating unit 304 may estimate the position of the robot 100 by use of the above described determined first distance and the second distance. The first distance may be determined according to a same or different length measuring scheme that is used to obtain the second distance. The position estimating unit 304 may compare the first distance with the second distance, and estimate the position of a particle, having a first distance that most approximates the second distance, as the position of the robot 100.

For example, the position estimating unit 304 may assign weights to each particle, update the weights based on the difference between a respectively determined first distance and a respectively determined second distance, and estimate that the position of the robot 100 is the position of the particle having the largest weight. In detail, the updating of one or more weights for each particle may be achieved by use of a Gaussian likelihood function according to the below Equation 1, for example.

$$W_t = W_{t-1} + k^* \exp(-|r-z|^2/2\sigma^2) \qquad \text{Equation 1}$$

Here, w is a weight, t is a time step, r is a first distance, z is a second distance, and k and a are parameters affecting the shape of a likelihood function. Parameters k and/or a may be fixed or dynamic. If a plurality of wireless communication apparatuses 106 are provided, a single weight of a particular particle may be updated in consideration of the number of the wireless communication apparatuses 106, e.g., the single weight may be updated based on an identified first distance and second distance for each wireless communication apparatus 106.

Figure 7:
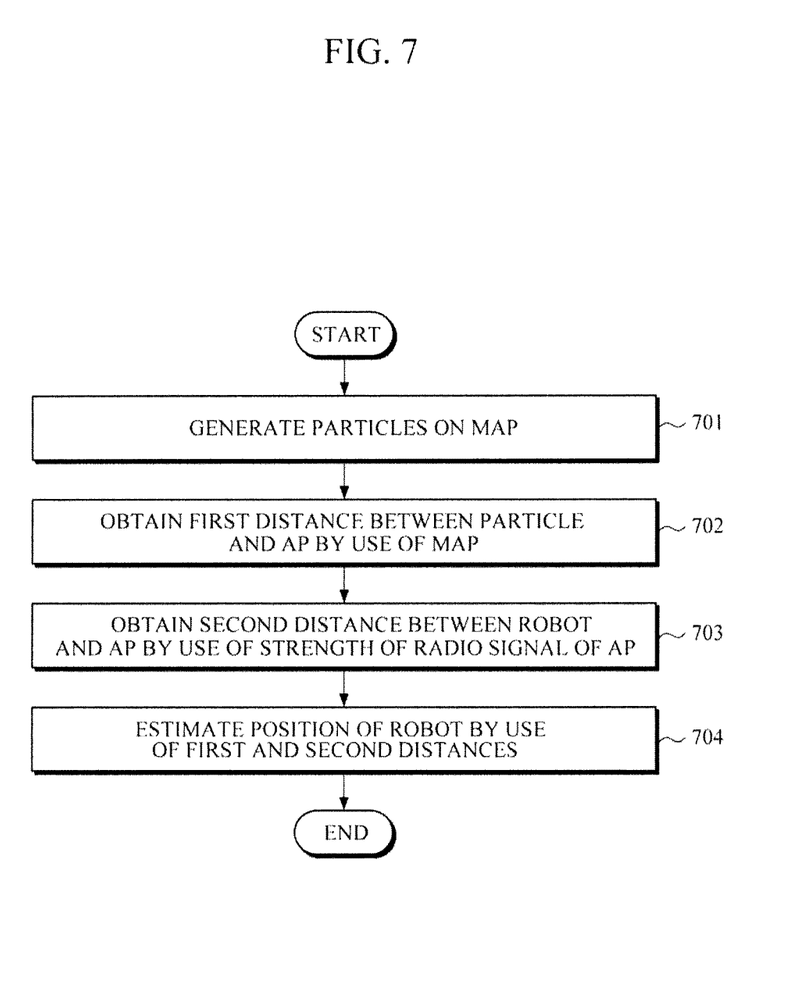
FIG. 7 illustrates a relocation method of a robot, according to one or more embodiments.

FIG. 7 shows an example of a relocation method of a robot, according to one or more embodiments. Depending on embodiment, the above described embodiments regarding FIGS. 1-6 should are equally applicable to the method of FIG. 7, such that the below method is described without repeating descriptions of all operations relating to the above indicated embodiments. Further, though the relocation method of FIG. 7 may be implemented using the robot 100 and wireless communication apparatus 106 of FIG. 1, the relocation method of FIG. 7 is not limited to the described system or apparatus embodiments.

As shown in FIG. 7, particles may be generated on a map, in operation 701, as indicated above, for example. As only an example, when a robot loses its position since the robot slips away or a user moves the robot to a new or predetermined position where the robot has lost its current position, a plurality of particles may be generated on the map 200, each particle corresponding to a position candidate of the robot, such as shown in FIG. 4.

After the generating of the particles, first distances between one or more particles and one or more wireless communication apparatuses may be obtained, e.g., using the map 200, in operation 702. As only an example, a first distance may be obtained by a first distance obtaining unit, such as the first distance obtaining unit 302 of FIG. 3, and as shown in FIG. 5. If an obstacle is between the particle and the wireless communication apparatus, resulting in a single path not being available between the particle and the wireless communication apparatus, a detour path may be identified, e.g., such as by implementing processes according to FIGS. 6A to 6F, so the first distance may be based on the length of the detour path.

After the obtaining of the first distance, as only an example, a second distance between the robot and one or more wireless communication apparatuses may be obtained by use of a strength measure of an electromagnetic signal of the wireless communication apparatus or based on the arrival time or time of flight (TOF) of the electromagnetic signal, in operation 703. As only an example, the second distance obtaining unit 303 of FIG. 3 may be controlled to obtain the second distance in consideration of a corresponding electromagnetic signal transmission path of the electromagnetic signal.

After the obtaining of the first distance and the second distance, one or more first distances may be compared with one or more second distance to estimate the position of the robot, in operation 704. As only an example, the position estimating unit 304 of FIG. 3 may be controlled to obtain weights of each particle by use of the difference between the first distance and the second distance, and estimate the position of the robot as being the position of the particle having the largest weight.

As at least described above, when a robot is moved to a new position, if the new position of the robot is included within an area where an electromagnetic ranging is achievable through a wireless communication apparatus, the robot may be relocated anywhere in the area and the new location of the robot may be estimated. In addition, since the robot is able to distinguish different rooms from each other, e.g., if the robot is a cleaning robot, the work efficiency of cleaning rooms is enhanced. In addition, relocation system, apparatus, and method embodiments, as supported herein, may be applied in a space specified service based on a user position in an indoor environment, again noting that alternatives are also available.

In one or more embodiments, any apparatus, system, and unit descriptions herein include one or more hardware devices and/or hardware processing elements/devices. In one or more embodiments, any described apparatus, system, and unit may further include one or more desirable memories, and any desired hardware input/output transmission devices, as only examples. Further, the term apparatus should be considered synonymous with elements of a physical system, not limited to a device, i.e., a single device at a single location, or enclosure, or limited to all described elements being embodied in single respective element/device or enclosures in all embodiments, but rather, depending on embodiment, is open to being embodied together or separately in differing devices or enclosures and/or differing locations through differing hardware elements.

In addition to the above described embodiments, embodiments can also be implemented through computer readable code/instructions in/on a non-transitory medium, e.g., a computer readable medium, to control at least one processing element/device, such as a processor, computing device, computer, or computer system with peripherals, to implement any above described embodiment. The medium can correspond to any defined, measurable, and tangible structure permitting the storing and/or transmission of the computer readable code. Additionally, one or more embodiments include the at least one processing element or device.

The media may also include, e.g., in combination with the computer readable code, data files, data structures, and the like. One or more embodiments of computer-readable media include magnetic media such as hard disks, floppy disks, and magnetic tape; optical media such as CD ROM disks and DVDs; magneto-optical media such as optical disks; and hardware devices that are specially configured to store and/or perform program instructions, such as read-only memory (ROM), random access memory (RAM), flash memory, and the at least one processing device, respectively. Computer readable code may include both machine code, such as produced by a compiler, and files containing higher level code that may be executed by the computer using an interpreter, for example. The media may also be any defined, measurable, and tangible elements of one or more distributed networks, so that the computer readable code is stored and/or executed in a distributed fashion. In one or more embodiments, such distributed networks do not require the computer readable code to be stored at a same location, e.g., the computer readable code or portions of the same may be stored remotely, either stored remotely at a single location, potentially on a single medium, or stored in a distributed manner, such as in a cloud based manner. Still further, as noted and only as an example, the processing element could include a processor or a computer processor, and processing elements may be distributed and/or included in a single device. There may be more than one processing element and/or processing elements with plural distinct processing elements, e.g., a processor with plural cores, in which case one or more embodiments would include hardware and/or coding to enable single or plural core synchronous or asynchronous operation.

The computer-readable media may also be embodied in at least one application specific integrated circuit (ASIC) or Field Programmable Gate Array (FPGA), as only examples, which execute (processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An apparatus for relocating a robot, the apparatus comprising:
    a particle generating unit configured to generate a plurality of particles and arrange the plurality of particles on a map;
    a first distance obtaining unit configured to obtain a first distance according to respective distances between each particle of the plurality of particles and a wireless communication apparatus performing wireless communication with the robot, the respective distances being based on a position of the wireless communication apparatus and respective positions of each particle on the map;
    a second distance obtaining unit configured to obtain a second distance according to a determined distance between the wireless communication apparatus and the robot, the determined distance being based on a strength measure of an electromagnetic signal received by the robot from the wireless communication apparatus or based on an arrival time or time of flight of the electromagnetic signal; and
    a position estimating unit configured to estimate a position of the robot by use of the first distance and the second distance.

2. The apparatus of claim 1, wherein coordinates of a select particle are chosen as the estimated position of the robot based on a select first distance, between the select particle and the wireless communication apparatus, being determined to more greatly approximate the second distance than other first distances between each of the other particles, excluding the select particle, and the wireless communication apparatus.

3. The apparatus of claim 1, wherein the first distance obtaining unit obtains the first distance, by calculating lengths of respective straight paths between the wireless communication apparatus and each particle,
    wherein the first distance obtaining unit selectively generates one of the respective straight paths to be a detour path, including at least two straight paths detouring around an obstacle between the wireless communication apparatus and a corresponding particle and which extend along open spaces between the wireless communication apparatus and the corresponding particle.

4. The apparatus of claim 3, wherein the one respective straight path includes at least two straight path lines that are obtained in consideration of electromagnetic transmission characteristics of a transmission signal from the wireless communication apparatus.

5. The apparatus of claim 1, wherein the first distance obtaining unit obtains the first distance by calculating a shortest signal transmission path of a transmission signal of the wireless communication apparatus, from respective signal transmission paths between the wireless communication apparatus and each particle, and using a length of the calculated shortest signal transmission path of the transmission signal as the first distance.

6. The apparatus of claim 5, wherein the transmission signal is the electromagnet signal.

7. The apparatus of claim 1, wherein the second distance obtaining unit obtains the second distance as being a shortest signal transmission path of plural signal transmission paths between the robot and respective electromagnet signals of plural wireless communication apparatuses, based on strength measures of the respective electromagnetic signals or based on respective arrival times or time of flight times of the respective electromagnetic signals.

8. The apparatus of claim 1, wherein the position estimating unit calculates the position of the robot by calculating and/or modifying a respective weight assigned to each particle according to differences between respectively obtained first distances and at least the second distance.

9. The apparatus of claim 8, wherein the position estimating unit modifies the respective weights in consideration of the robot being in communication with plural wireless communication apparatuses, with respective first distances and respective second distances being calculated by the first distance obtaining unit and the second distance obtaining unit, respectively, using the plural wireless communication apparatuses.

10. The apparatus of claim 1, wherein the electromagnetic signal includes at least one of a radio frequency (RF) signal, an infrared ray signal, and an ultrasonic signal.

11. The apparatus of claim 1, wherein the apparatus is a robot location system comprising the robot and the wireless communication apparatus, with the robot comprising the particle generating unit, the first distance obtaining unit, the second distance obtaining unit, and the position estimating unit, separate from the wireless communication apparatus.

12. A method of relocating a robot, the method comprising:
generating a plurality of particles and arranging the plurality of particles on a map;
obtaining a first distance according to respective distances between each particle of the plurality of particles and a wireless communication apparatus performing wireless communication with the robot, the respective distances being based on a position of the wireless communication apparatus and respective positions of each particle on the map;
obtaining a second distance according to a determined distance between the wireless communication apparatus and the robot, the determined distance being based on a strength measure of an electromagnetic signal received from the wireless communication apparatus or based on an arrival time or time of flight of the electromagnetic signal; and
estimating a position of the robot by use of the first distance and the second distance.

13. The method of claim 12, further comprising choosing coordinates of a select particle as the estimated position of the robot based on a select first distance, between the select particle and the wireless communication apparatus, being determined to more greatly approximate the second distance than other first distances between each of the other particles, excluding the select particle, and the wireless communication apparatus.

14. The method of claim 12, wherein, in the obtaining of the first distance, the first distance is obtained by calculating lengths of respective straight paths between the wireless communication apparatus and each particle,
wherein one of the respective straight paths is selectively made to be a detour path, including at least two straight paths detouring around an obstacle between the wireless communication apparatus and a corresponding particle and which extend along open spaces between the wireless communication apparatus and the corresponding particle.

15. The method of claim 14, wherein the one respective straight path includes at least two straight path lines that are obtained in consideration of electromagnetic transmission characteristics of a transmission signal from the wireless communication apparatus.

16. The method of claim 12, wherein, in the obtaining of the first distance, the first distance is obtained by calculating a shortest signal transmission path of a transmission signal of the wireless communication apparatus, from respective signal transmission paths between the wireless communication apparatus and each particle, and using a length of the calculated shortest signal transmission path of the transmission signal as the first distance.

17. The method of claim 16, wherein the transmission signal is an electromagnetic signal.

18. The method of claim 12, wherein, in the obtaining of the second distance, the second distance is obtained as being a shortest signal transmission path of plural signal transmission paths between the robot and respective electromagnetic signals of plural wireless communication apparatuses, based on strength measures of the respective electromagnetic signals or based on respective arrival times or time of flight times of the respective electromagnetic signals.

19. The method of claim 12, wherein, in the estimating of the position, the position of the robot is estimated by calculating and/or modifying a respective weight assigned to each particle according to differences between respectively obtained first distances and at least the second distance.

20. The method of claim 19, wherein, in the estimating of the position, the respective weights are modified in consideration of the robot being in communication with plural wireless communication apparatuses, with respective first distances and respective second distances being calculated respectively using the plural wireless communication apparatuses.

21. The method of claim 12, wherein the electromagnetic signal includes at least one of a radio frequency (RF) signal, an infrared ray signal, and an ultrasonic signal.

* * * * *